US008724902B2

(12) United States Patent
Zhang et al.

(10) Patent No.: US 8,724,902 B2
(45) Date of Patent: May 13, 2014

(54) PROCESSING IMAGE DATA (75) Inventors: Wei Zhang, Fremont, CA (US); Tong Zhang, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 799 days.

(21) Appl. No.: 12/791,680

(22) Filed: Jun. 1, 2010

(65) Prior Publication Data

US 2011/0293188 A1 Dec. 1, 2011

(51) Int. Cl.
*G06K 9/00* (2006.01)
(52) U.S. Cl.
USPC .......................................................... 382/181
(58) Field of Classification Search
None
See application file for complete search history.

(56) References Cited

U.S. PATENT DOCUMENTS

| | | | | |
|---|---|---|---|---|
| 6,323,898 | B1 * | 11/2001 | Koyanagi et al. | 348/169 |
| 6,445,810 | B2 * | 9/2002 | Darrell et al. | 382/115 |
| 7,668,405 | B2 * | 2/2010 | Gallagher | 382/305 |
| 8,316,301 | B2 * | 11/2012 | Kim et al. | 715/723 |
| 2006/0253491 | A1 * | 11/2006 | Gokturk et al. | 707/104.1 |

OTHER PUBLICATIONS

T. Cour, F. Benezit, and J. Shi, "Spectral Segmentation with Multiscale Graph Decomposition," CVPR, 2005.
J. Winn, A. Criminisi, and T. Minka, "Object Categorization by Learned Universal Visual Dictionary," ICCV, 2005.
N. Dalal and B. Triggs, "Histogram of Oriented Gradients for Human Detection," IEEE Conference on Computer Vision and Pattern Regcognition, 2005.
P. Viola and M. Jones, "Rapid Object Detection Using a Boosted Cascade of Simple Features," IEEE Conf. Computer Vision Pattern Recognition, 2001.
A. Gallagher and T.Chen, "Clothing cosegmentation for reconizing people," IEEE Conf. on Computer Vision and Pattern Recognition, 2008, CVPR 2008, Jun. 2008, pp. 1-8.
A. Gallagher and T. Chen, "Clothing cosegmentation for recognizing people," IEEE Conf. on Computer Vision and Pattern Recognition, 2008, CVPR 2008, Jun. 2008, pp. 1-8.
W. Gao, H. Al and S. Lao, "Adaptive contour features in oriented granular space for human detection and segmentation," IEEE Conf. on Computer Vision and Pattern Recognition, 2009, CPVR 2009, Jun. 2009, pp. 1766-1793.
X. Bai, Q. Li, L. Latecki, W. Liu and Z. Tu, "Shape band: a deformable object detection approach," IEEE Conf. on Computer Vision and Pattern Recognition, 2009, CVPR 2009, Jun. 2009, pp. 1335-1342.
Y. Song and T. Leung, "Context-aided human recognition—clustering," European Conference on Computer Vision, 2006, Computer Vision-ECCV 2006, pp. 382-395.

* cited by examiner

*Primary Examiner* — Vikkram Bali (57) ABSTRACT

A method for processing image data comprises generating face data representing a set of detected faces from image data representing a set of images forming a library of images, using the face data to determine a sub-set of the images from the library in which at least the same person appears, and generating at least one clothing signature for the person representing clothes worn by the person in at least one of the images in the sub-set, and using the or each clothing signature, identifying further images of the person in the library.

16 Claims, 6 Drawing Sheets

PROCESSING IMAGE DATA

BACKGROUND

With the proliferation of image capture devices in the form of cameras, mobile phones with imaging capability, and video cameras with stills capability for example, and the relatively cheap nature of data storage for such devices, there has been an explosion of digital image data. An average user may have in the region of several thousand images stored on one or more of their computers, or stored in remote storage locations for access anywhere, anytime. A library of digital images can contain a large number of images in which one or more people are the subject or are otherwise in the image. This is particularly the case with consumer image collections, which will predominantly comprise images of events such as parties, weddings and the like. Clearly, with the vast number of digital images being captured, stored and consumed, it is important for users to be able to quickly and efficiently sort and categorise images into manageable collections in order to improve their experience when consuming, distributing or printing images.

There are methods which can be used to sort and categorise images in an image collection or library. For example, image management systems can analyze an image library and, with some user input, identify and categorize images on the basis of people identified within images of the library, or more specifically, on the basis of identified faces of people. As such, existing personal image management approaches generally rely on the use of automated face detectors which are used to find the people of interest in the images, and which rely on some user input in order to validate or otherwise augment the provision of face detection.

Such face detectors are not perfectly accurate, and they can regularly fail to find a person, especially when the face of the person is partially or completely undetectable to the detector such as, for example, when the face is side-viewed, back-viewed or otherwise occluded by other people, objects or due to poor image capture parameters such that the face cannot accurately be identified and processed as required. Accordingly, a relatively low and generally unacceptable recall rate for such face detectors can limit the possibility of automatically retrieving all the images in a library or catalog containing each person of interest.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

Reference will now be made in detail to certain implementations, examples of which are illustrated in the accompanying drawings. In the following detailed description, numerous specific details are set forth in order to provide a thorough understanding of the implementations. Well-known methods, procedures, components, circuits, and networks have not been described in detail so as not to unnecessarily obscure aspects of the implementations.

It will also be understood that, although the terms first, second, etc. may be used herein to describe various elements, these elements should not be limited by these terms. These terms are only used to distinguish one element from another. For example, a first item could be termed a second item, and, similarly, a second item could be termed a first item.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
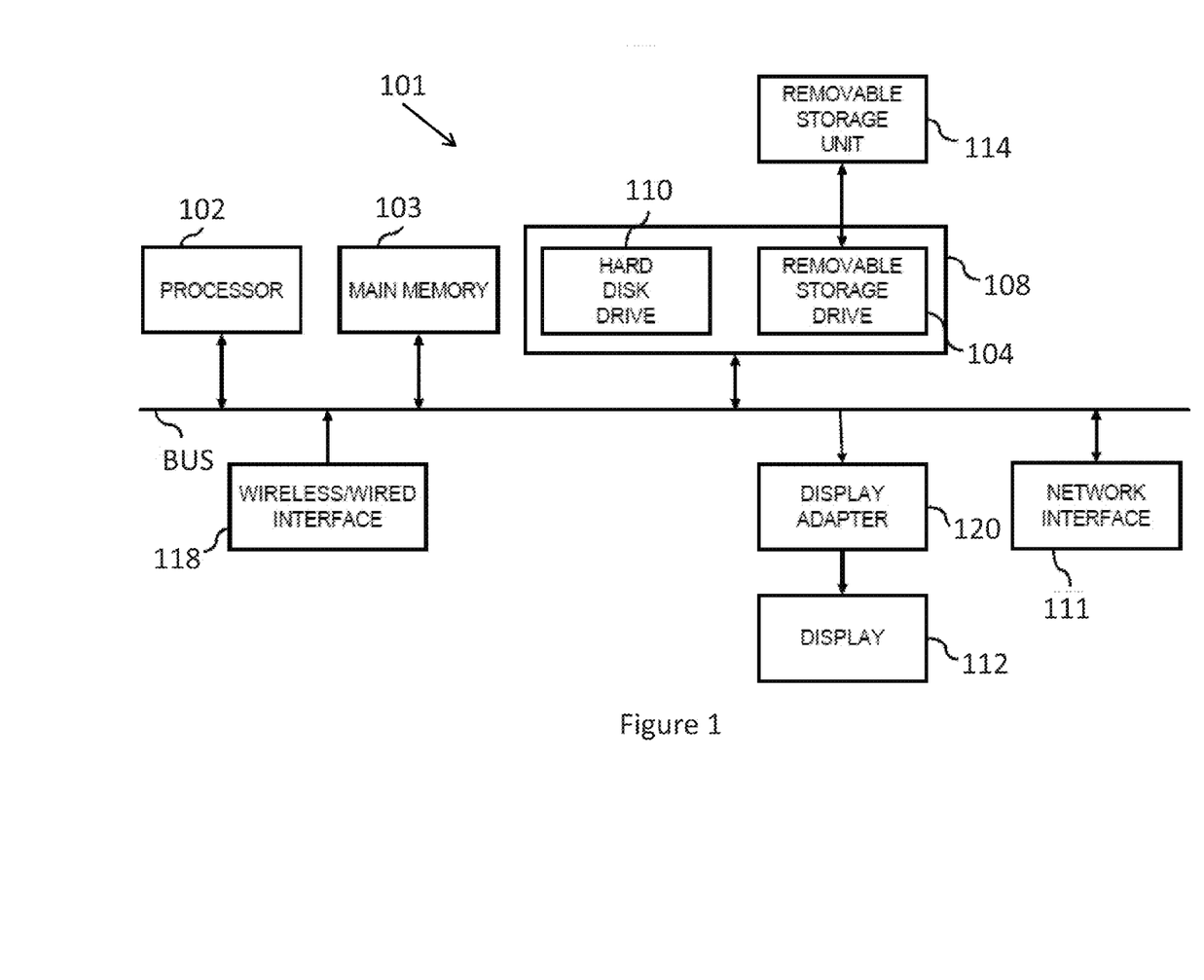
FIG. 1 is a functional block diagram depicting an architecture of a computing apparatus suitable for implementing embodiments.

FIG. 1 is a functional block diagram depicting an architecture of a computing apparatus 101 suitable for use according to implementations. The apparatus comprises a data processor 102, which can include one or more single-core or multi-core processors of any of a number of computer processors, such as processors from Intel, AMD, and Cyrix for example. As referred to herein, a computer processor may be a general-purpose processor, such as a central processing unit (CPU) or any other multi-purpose processor or microprocessor. The processor 102 comprises one or more arithmetic logic units (not shown) operable to perform operations such as arithmetic and logical operations of the processor 102.

Commands and data from the processor 102 are communicated over a communication bus or through point-to-point links (not shown) with other components in the apparatus 101. More specifically, the processor 102 communicates with a main memory 103 where software can be resident during runtime. A secondary memory (not shown) can be used with apparatus 101. The secondary memory can be, for example, a computer-readable medium that may be used to store software programs, applications, or modules that implement embodiments of the invention, or parts thereof. The main memory 103 and secondary memory (and optionally a removable storage unit 114) each includes, for example, a hard disk drive 110 and/or a removable storage drive such as 104, which is a storage device connected to the apparatus 101 via a peripherals bus (such as a PCI bus for example) and representing a floppy diskette drive, a magnetic tape drive, a compact disk drive, etc., or a non-volatile memory where a copy of the software is stored. In one example, the secondary memory also includes ROM (read only memory), EPROM (erasable, programmable ROM), EEPROM (electrically erasable, programmable ROM), or any other electronic, optical, magnetic, or other storage or transmission device capable of providing a processor or processing unit with computer-readable instructions. Apparatus 101 can optionally comprise a display 112 connected via the peripherals bus (such as a PCI bus) for example, as well as user interfaces comprising one or more input devices, such as a keyboard, a mouse, a stylus, and the like. A network interface 111 can be provided for communicating with other computer systems via a network.

Implementations can be executed by a dedicated hardware module, such as an ASIC, in one or more firmware or software modules, or in a combination of the same. A firmware embodiment would typically comprise instructions, stored in non-volatile storage, which are loaded into the CPU 102 one or more instructions at a time for example. A software embodiment would typically comprise one or more application programs that is/are loaded from secondary memory into main memory 103, when the programs are executed.

According to an embodiment, clothing information—which is more invariant to view changes and occlusion than face detection alone—is used in order to identify one or more people present in an image where face detection can have failed or given a spurious result. More specifically, major characters of interest in an image collection can be determined and clustered to provide sub-sets of images in which the person is present. In respective ones of the sub-sets forming clusters of images for a common person, clothing features are extracted in the form of one or more clothing signatures. The signature(s) can then be used to search for the person in other images which were not included in the cluster because, for example, an automated face detection process failed to discover them. In order to leverage the fact that a person is very unlikely to change their clothing within a short period of time (such as a day, or half a day or any other suitable time period for example) the search can be limited to only those images taken within the given time period. A major character can be, for example, a family member or some other person who has appeared in a proportion of the images under consideration. Accordingly, the proportion is likely to be more significant than that of a person who is, for example, not a family member, or is otherwise not intended to be the main subject of one or more images.

Figure 2:
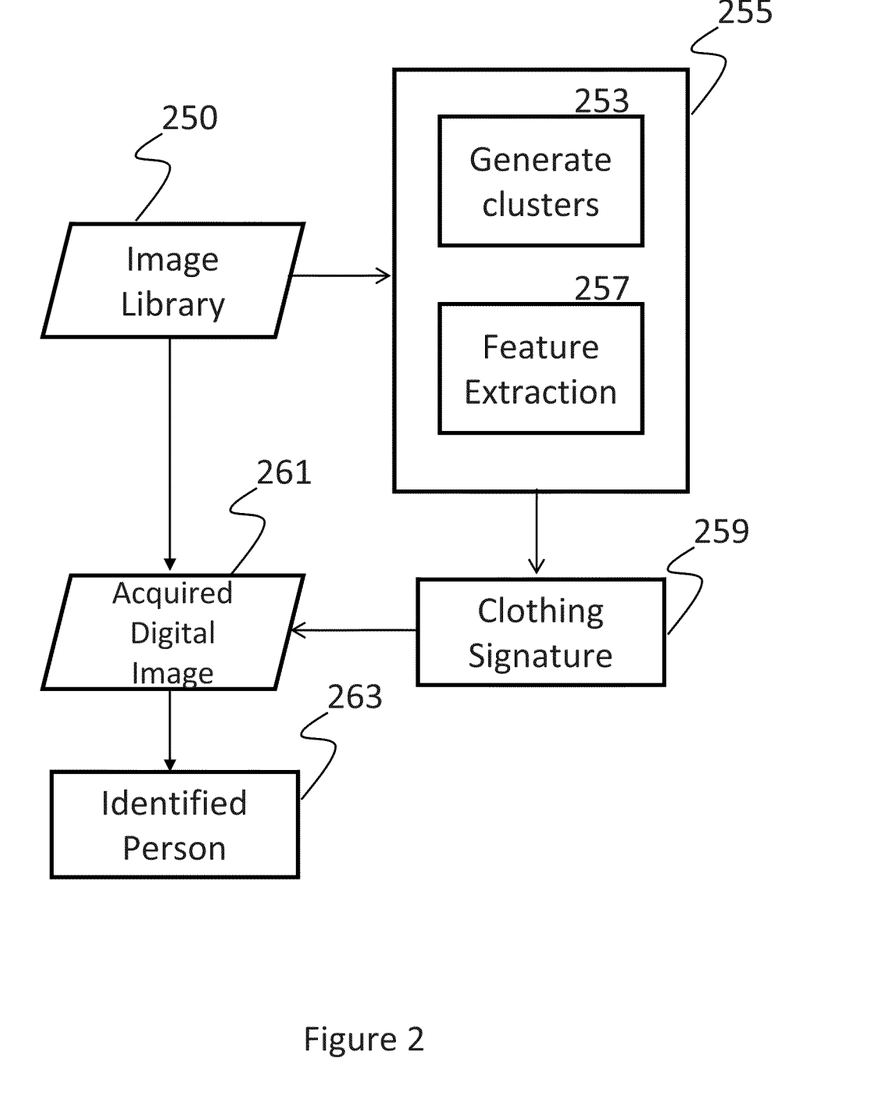
FIG. 2 is a functional block diagram of an image processing method according to an embodiment.

FIG. 2 is a functional block diagram depicting an overview of a system for image processing according to an embodiment. In an image library 250 comprising a number of digital images, automatic face clustering 253 is performed within a processing engine 255 of the system. The face clustering firstly detects faces using a face detector, and then groups the detected faces into respective clusters representing a sub-set of images from the image library. Each cluster comprises the faces of one person (although it is entirely reasonable to expect that a number of the images will actually contain other faces as well, however those other faces will also appear in their own respective clusters, i.e. each cluster is dedicated to one person only, irrespective of the presence of others in any of the corresponding images). Alternatively, for a number of images in which the same people consistently appear together, a cluster can be defined for those people. Major face clusters are defined, which comprise sub-sets of images from the library in which the faces of respective people appear. A cluster comprising a relatively larger number of images in which a person appears can be classified as a major cluster. The number required to classify a cluster as a major cluster can be a predetermined number (e.g. a number between 5 and 10), or it can be a proportion of the number of images in the library (such as 10% for example), or can be determined in response to the number of clusters which have been determined. For example, the largest 10% of determined clusters can be classified as major clusters—that is to say, major clusters can be defined as those which are the largest sub-sets of images from those generated. It will be appreciated that other ways of categorizing the sub-sets can be used, and the above is not intended to be limiting. In fact, it is entirely possible that all sub-sets can be classified as major clusters.

The major clusters can be used in order to provide a measure of notionally important people in the photo collection. According to an embodiment, for each major cluster, clothing features in the form of a clothing signature are extracted for the person in module 257. If the person in question is in, for example, three sets of clothes in different images in the cluster, then the features of the three sets of clothes are extracted respectively, and form three clothing descriptors for the person in question, as will be described below. A plurality of clothing descriptors for a person can be amalgamated by concatenating the signatures in order to provide a 'master' or representative signature which is used to locate that person in other images in which face detection has failed. One person may have more than one representative clothes signature, each representing one set of clothes that the person wears in the picture(s). Thus, each representative signature is formed by concatenating clothes features derived from different images containing the same clothes.

Referring to FIG. 2, for each set of clothes, a clothing signature 259 is derived which is represented as signature data. The signature can then be used to search the library of images in order to identify the person from which the signature was generated in order to identify that person in other images. In order to augment the process and to help remove possible false alarms, some restrictions may be applied, such as using a head-shoulder detector for example. That is to say, any identified clothing features can be validated by the provision of a corresponding head/shoulder region for the features. In this way, images of a person can be found which were not detected by the face detector, and therefore not included in a cluster.

Figure 3:
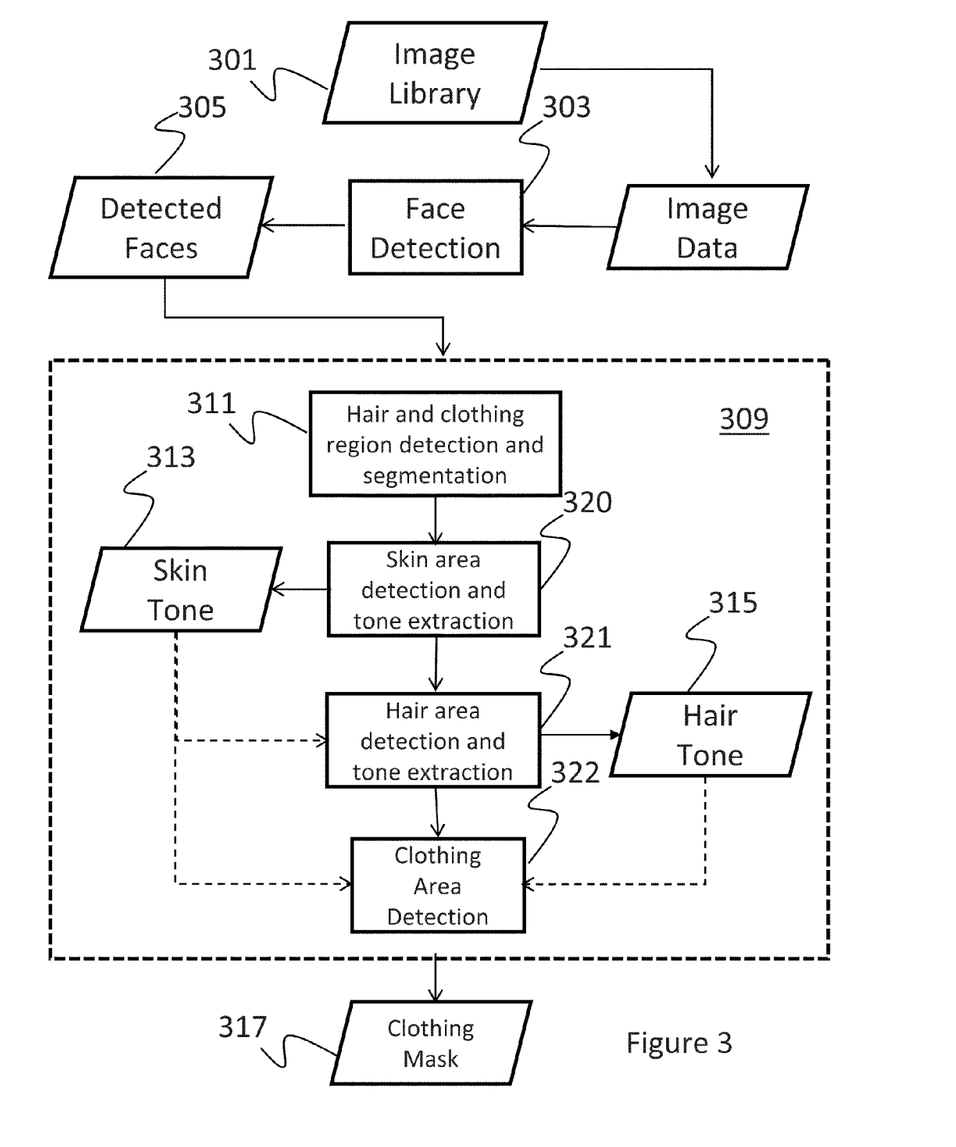
FIG. 3 is a functional block diagram of an aspect of an image processing method according to an embodiment.

FIG. 3 is a functional block diagram of an image processing method according to an embodiment. An image library 301, stored on HDD 110 for example, comprises a collection of digital images (not shown). Such digital images can be images which have been captured by an image capture device such as a digital camera for example, or can be digital images representing physical counterparts, which have been scanned into digital format for example. In any case, the image collection comprises at least a subset of images which have as their subject, or otherwise comprise, one or more people, the faces of whom may be visible, partially occluded, or not visible. That is to say, one or more persons may or may not be present in each image of the library, such that a subset of images in the collection may be devoid of a person altogether.

An acquired digital image from the image library is processed at step 303 in order to detect any faces within the image. This step is repeated for all or some of the images in the image library in order to provide a set of detected faces 305. If the image library is relatively small (such as of the order of several hundred images for example), each image can be examined in order to generate data 305 representing a set of detected faces in the images. If the number of images in the image library is relatively large (such as of the order of several thousand for example) a subset of the images can be selected for processing in order to detect faces and generate a set of detected faces 305. The subset can be a predetermined number, such as a predetermined percentage for example, or can be a set number (such as 500). The subset can be user-selected, or randomly chosen, perhaps with user validation if required in order to confirm that a representative set has been selected. Alternatively, the sub-set can be selected on the basis of image content—for example, during an upload process, images can be processed in order to provide a measure of image content. The sub-set can therefore comprise images which have been found to comprise salient content. Alternatively, all images in the image library can be processed in order to detect faces regardless of the library size. This can be dependent on the preference of the user and/or the computing power available to perform such tasks as face detection for the images. It can be desirable to process all or some images remotely from the user—for example, images stored remotely using an image storage service can be processed at that location, and the results fed back to a user's location. It will be appreciated that any combination of the above can be implemented as desired.

A face detection process with a high detection threshold is used in order to detect faces with high precision. Applying a face detector with a higher threshold means that more of the detected faces are real faces as opposed to false identifications (that is to say there is a higher precision rate). However, this can result in more faces being missed by the detector (such that there is a lower recall rate). However, in general, it is more desirable to ensure that all the detected faces are real faces rather than have a larger set which comprises some false readings, so that a noise-free clothing model can be generated. A clothing model as described below can be applied to detect people missed by the face detector thereby increasing the recall rate of person detection for the image library. The lower recall is therefore recoverable because any faces missed by the face detector can be detected using a clothing signature. According to an embodiment, a face detection method such as that described in P. Viola and M. Jones. "Rapid object detection using a boosted cascade of simple features," IEEE Conf. Computer Vision Pattern Recognition, 2001, the contents of which are incorporated herein in their entirety by reference, can be used.

The resultant detected faces 305 are used to determine corresponding clothing data for respective people whose faces have been detected, as well as respective head/hair positions. More specifically, dependent on the size of the detected face, a notional bounding box can be positioned over the detected face—such face boxes are conventional and no special requirements need be met. In fact, the face box merely acts as a reference for the definition of regions for the hair and clothes of a person which allows the generation of a clothing signature. According to an embodiment, corresponding clothing (322) and hair boxes (321) are placed below and above the automatically detected face box according to a set of heuristic ratios, and the sizes of these boxes are normalized according to the size of the face box. The sizes and positions of the boxes relative to the face box can be defined as, for example: width_hair=0.6*width_face, height_hair=0.4*height_face; centerx_hair=centerx_face; centery_hair=topy_face−0.3*height_face; width_clothing=1.6*width_face, height_clothing=2.0*height_face; centerx_clothing=centerx_face; centery_clothing=bottomy_face+1.2*height_face. Other alternatives are possible, however the ratios given above have been found to give good results. Measurements can be in pixels for example, or some other suitable unit. An initial bounding box for a detected face is positioned and sized according to the algorithm defined in the Viola, Jones method referenced above.

Figure 4:
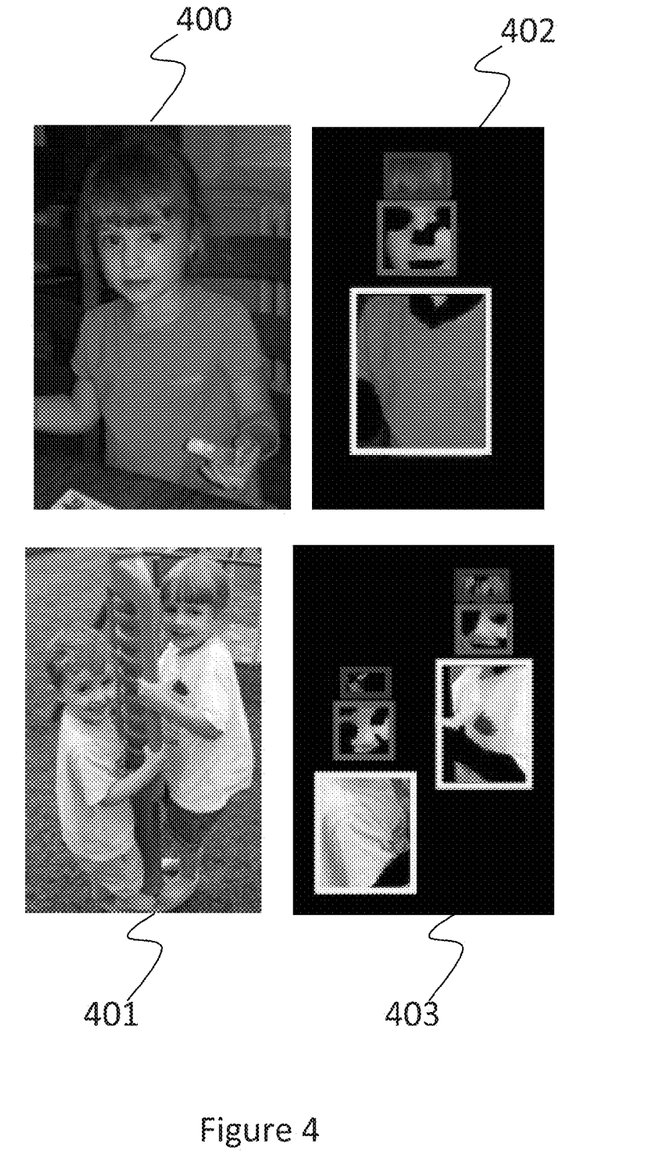
FIG. 4 is a schematic representation of two images which have been processed according to an embodiment.

FIG. 4 is a schematic representation of two images 400, 401 which have been processed according to an embodiment in order to determine face, clothing and hair bounding boxes. For image 400, clothing and hair bounding boxes are sized and positioned based on the size and location within the image of the detected face. Other regions can be discarded, resulting in only the face, clothing and hair information 402. Similarly for FIG. 401, in which two children are present, the size and position of the detected faces provides the basis for the clothing, face and hair bounding boxes of 403.

Within each identified cluster of images for respective people, and for each image, the face region of the person in question is segmented 311 in order to detect skin areas 320. According to an embodiment, a multi-scale normalized cut algorithm is applied to segment each region into homogeneous segments. A suitable algorithm is described in T. Cour, F. Benezit, and J. Shi. "Spectral segmentation with multiscale graph decomposition," CVPR, 2005, the contents of which are incorporated herein in their entirety by reference. Refined regions are obtained by removing two types of segments. Firstly, smaller segments are removed. These segments usually correspond to background clutter, shadowed areas, or other non-dominant areas in the region. Secondly, overlapping segments are removed. These segments are the areas expected to belong to other body parts. More specifically, the skin segmentation is obtained by removing the small segments within the skin region.

In the refined regions, the skin tone 313 of the person is extracted by clustering the pixels in the skin areas under the CIElab color space, which is a perceptually uniform colour space (such that a small perturbation to a component value is approximately equally perceptible across the range of that value). Other colour spaces can be used, as will be appreciated by those skilled in the art. The determined skin tone is then used to remove the skin areas in the hair region for the person. Accordingly, the skin tone of a person is learned from within the person's face box. The segments remaining after removal form the refined regions for the skin mask. The color value of each pixel in the skin mask in the refined regions is extracted and pooled. These color values are representative of the skin color of the person. The pooled color values are clustered using a Gaussian Mixture Modeling algorithm in order to provide a skin signature for the person (which can also be termed skin tone). The skin signature is used to remove the skin-like areas within other contextual regions, such as the hair and clothing regions. Referring to FIG. 4, it can be seen that certain regions in the hair and face bounding boxes for each image 400, 401 are blacked out, corresponding to the removal of pixels within those areas as a result of skin tone determination, and skin region removal as appropriate.

Accordingly, for skin segmentation and skin tone extraction:

Within a face box detected by face detector, a multi-scale normalized cut algorithm is run to segment the box into homogeneous segments. The areas of the segments need not necessarily be equal. However, the texture within each segment can be uniform. Some (50% for example) of the segments that are smaller are removed because they usually correspond to background regions or shadowed regions on the face. The remaining segments form the skin segmentation region of the detected face. For each pixel within the skin segmentation region, the pixel's color value vector is extracted (which is a 3 dimensional vector in the CIELab color space). Thus there is a pool of color value vectors from the skin segmentation region. Using this vector pool, a Gaussian Mixture Model (GMM) with diagonal covariance matrix is generated in order to cluster the color value vectors. The resultant GMM is the skin tone 313 of the person, and can be used for skin tone matching in subsequent images for example.

The hair tone 315 of the person is extracted in the refined hair region in similar way to the skin tone. The skin tone and the hair tone are used to remove the skin and hair areas in the clothing region to obtain a final clothing mask for the person. This is repeated for each image and each image cluster in order to obtain a clothing mask for each image for each person in a major cluster. Thus, clothing features in the form of a clothing mask 317 are extracted within the cleaned clothing region. The images can be white-balanced and down-scaled if desired in order to maintain white balance uniformity across images, and to speed up processing. According to an embodiment, the person's head-shoulder features can also be extracted in order to prune out any false detections in new images.

According to an embodiment, the GMMs generated are probabilistic models for density estimation that define the required skin/hair tone signature of the person. Note that, CIELab describes all the colors visible to the human eye. The three coordinates of CIELab represent the luminance of the color (L=0 yields black and L=100 indicates diffuse white; specular white may be higher), its position between red/magenta and green ("a", negative values indicate green while positive values indicate magenta) and its position between yellow and blue ("b", negative values indicate blue and positive values indicate yellow). Since the Lab model is a three-dimensional model, it can only be represented properly in a three-dimensional space. Other alternatives are possible, such as using one of the other colour space models for example.

Clothing segmentation and clothing feature extraction proceeds in a similar fashion, that is to say, within the identified clothing box (corresponding to the face box), the box is segmented into regions in the same way as above. Similarly, a proportion (such as 50% for example) of the relatively smaller segments are discarded. The identified skin tone is then compared to each of the remaining segments, and any skin-like segments are discarded. All remaining segments are defined as those which belong to clothing, and therefore form the clothing segmentation region, or mask, for the image in question. At each pixel within the clothing segmentation region, the pixel's color value vector is extracted (again, a 3-dimensional vector, in CIELab color space), and a Gaussian Mixture Model (GMM) with a diagonal covariance matrix is generated to cluster the color value vectors. The obtained GMM is the color signature, or descriptor, of the clothing. At each pixel within the clothing segmentation region, the pixel's texture value vector is also extracted by convolving the clothing segmentation with a suitable filter bank. The texture value vectors are clustered in the same way as above, with the resultant GMM defining the texture signature of the clothing.

Accordingly, clothing segmentation and clothing feature extraction proceeds as follows:

For the clothing box—which has been determined on the basis of the size and position within the image in question of the face box corresponding to a detected face—segmentation is performed in the same way as above. Thus, according to an embodiment, 50% of the relatively smaller segments are removed. The determined skin tone is then compared to each of the remaining 50% segments using the skin tone signature, and any determined skin-like segments are discarded. The determined hair tone is also compared to each of the remaining segments using the hair tone signature, and any determined hair-like segments are discarded. All the remaining segments belong to clothing. These segments thus form the clothing segments for the person. At each pixel within the clothing segmentation, the pixel's color value vector is extracted, and a GMM is generated in order to cluster the color value vectors in order to generate the color signature of the clothing. Also, at each pixel within the clothing segmentation, the pixel's texture value vector is extracted (by convolving the clothing segmentation with a filter bank). A GMM is generated in order to cluster the texture value vectors in order to provide a texture signature for the clothing.

In the approaches described above, a number of Gaussian functions are taken as an approximation to a multi-modal distribution in the desired colour/texture space and conditional probabilities are then computed for colour/texture pixels. The conditional probability density for a pixel x belonging to an object, O, is modeled as a Gaussian mixture with m components:

$$p(O|x) = \sum_{j=1}^{m} p(j|x)\pi(j)$$

where a mixing parameter $\pi(j)$ is the prior probability that x was generated by the j'th component, $$\sum_{j=1}^{m} \pi(j) = 1.$$

Each mixture component, $p(j|x)$, is a Gaussian probability density function with mean $\mu$ and covariance matrix $\Sigma$. An Expectation-Maximization (EM) algorithm can effectively provide a maximum-likelihood solution for fitting such a mixture to a data set.

A color signature for a skin tone, $S_{skin}$ is defined by the centroids and relative sizes of the Gaussian components as:

$$S_{skin} = \{(c_1,w_1), (c_2,w_2), \ldots, (c_k,w_k)\}$$

where k is the number of components, $c_i$ is the centroid of the ith component, and $w_i$ is the relative size of the ith component, which is defined as the ratio of the number of pixels assigned to the ith component against the total number of pixels. According to an embodiment, a value for k within a range $1<k<50$ can be used. More specifically, k=20 is a suitable value, although it will be appreciated that other suitable values can be selected as required, which values can lie outside of the range.

Similarly, the hair tone for a person, $S_{hair}$ within the refined hair segmentation region can be learnt (after the small segments and the skin segments are removed). Then the learned skin tone $S_{skin}$, and hair tone $S_{hair}$ are applied to remove skin and hair segments within the clothing region. A segment is considered to be a skin (hair) segment if it satisfies the following two criteria:

1. The segment is smooth. The smoothness is measured by the variance of the color pixels in CIELab space within the segment.
2. The segment is similar enough to the skin (hair) tone. The dissimilarity is measured by the minimum Mahalanobis distance in CIELab space between the mean of the color pixels within the segment to the Gaussian components of the skin (hair) tone.

A clothing region's texture signature has the same form as above. It is learned by computing the GMM with a diagonal covariance matrix on the texture pixels densely sampled at every pixel within the clothing region. A texture pixel is computed by convolving the clothing region with multi-scale filter banks. According to an embodiment, a filter set such as that used in J. Winn, A. Criminisi, and T. Minka. "Object categorization by learned universal visual dictionary", ICCV, 2005, the contents of which are incorporated herein by reference in their entirety is employed, which is composed of 9 Gaussians, 4 first order derivatives of Gaussians and 4 Laplacian of Gaussians (LoG), applied in CIELab channels. Accordingly, it can be seen that each texture pixel has a dimension of 17.

Figure 5:
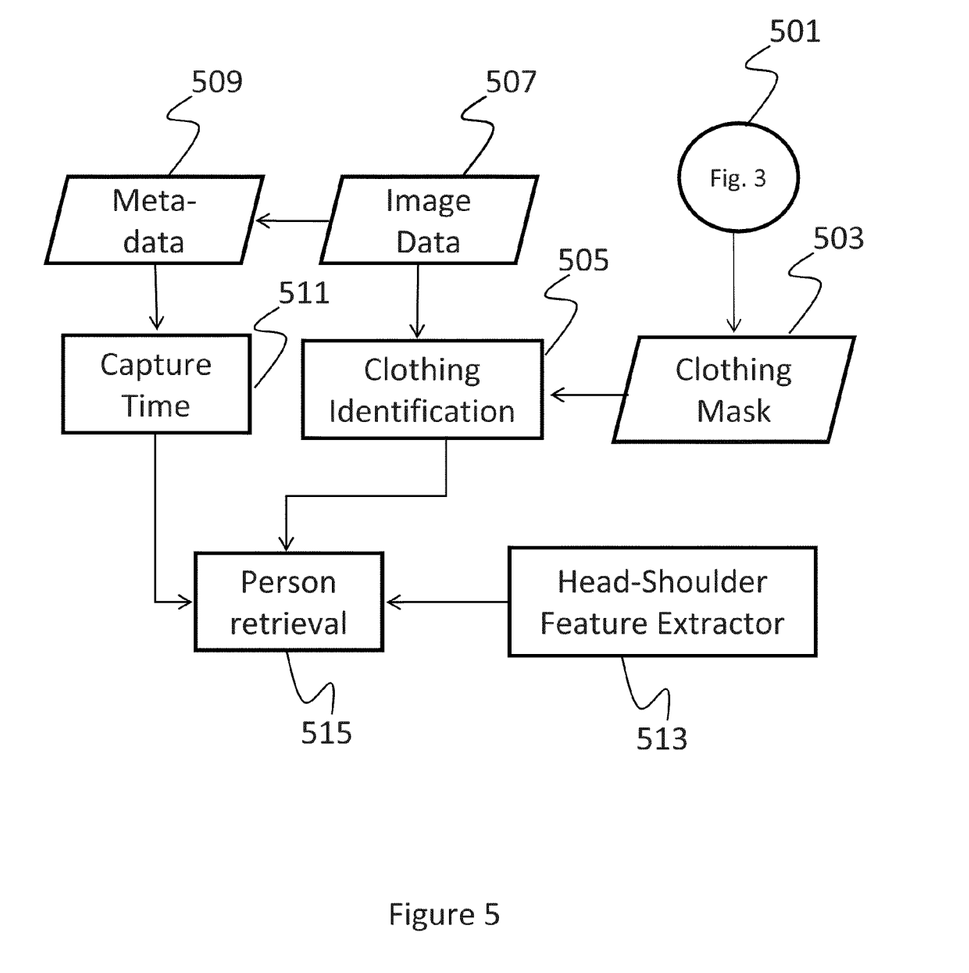
FIG. 5 is a functional block diagram of an aspect of an image processing method according to an embodiment.

FIG. 5 is a functional block diagram of an image processing method according to an embodiment. Output from FIG. 3, 501, is in the form of data representing a clothing mask 503. The data is input to a clothing identification module 505. This module operates on image data in order to identify a person within that image. So, for example, an image 507 from the image library in which a face has not been detected can be input to the clothing identification module 505. Meta data 509 from the image can be used to determine the capture time 511 of the image. The capture time can be used to constrain which image 507 from a collection is selected. For example, if the capture time is within a predetermined time frame, such that the image in question was taken on same day as that from which the clothing signature has been determined for example, the image can be selected. Accordingly, the fact that a person is unlikely to change their clothes on the same day can be leveraged in order to select and process suitable images in order to identify that person within images of the library using the generated clothing signature.

Optionally, data representing head-shoulder features can also be used in order to ensure that less false readings are given. For example, the head-shoulder data can be used to identify the presence of one or more people within an image, and give their positions within the image, subject to an acceptable tolerance. Head-shoulder features can be extracted from the image using the feature extractor 513, and the output data can be used to ensure that any identified person (as identified using a clothing signature) has a corresponding head-shoulder region associated with them so that most false identifications can be discarded (i.e. if there is no associated head-shoulder region, this can provide an indication that the clothing signature has been matched to something other than a person for example). A human detection method such as that described in N. Dalal and B. Triggs. "Histogram of Oriented Gradients for Human Detection," IEEE Conference on Computer Vision and Pattern Recognition, 2005, the contents of which are incorporated herein in their entirety by reference, can be used in this regard. The result is the retrieval of a person 515 from the image, which person may not been identified at the face detection stage.

The clothing features extracted from images in a person's face cluster can be consolidated to generate a number of clothing models. More specifically, first the distance between each pair of clothes is measured by matching their color and texture signatures using the Earth Mover's distance (EMD). Then based on the resultant distance matrix, the average-link hierarchical clustering is applied to group all the clothes pieces into multiple clothing clusters. For example, given a set of N signatures (descriptors) to be clustered, the basic process for hierarchically clustering the signatures can proceed as:

1) Start by notionally assigning each signature to its own cluster. Let the distances (similarities) between the clusters equal to the distances (similarities) between the items they contain;
2) Find the closest (most similar) pair of clusters and merge them into a single cluster, so that there is one less cluster;
3) Compute distances (similarities) between the new cluster and each of the old clusters.

Repeat steps 2 and 3 until all items are clustered into a desired number of clusters. Step 3 can be done in numerous different ways—for example, using single-link clustering the distance between one cluster and another cluster is taken to be equal to the shortest distance from any member of one cluster to any member of the other cluster. If the data consist of similarities, the similarity between one cluster and another cluster is taken to be equal to the greatest similarity from any member of one cluster to any member of the other cluster. In complete-link clustering the distance between one cluster and another cluster is taken to be equal to the longest distance from any member of one cluster to any member of the other cluster. In average-link clustering, the distance between one cluster and another cluster is taken to be equal to the average distance from any member of one cluster to any member of the other cluster.

Accordingly, corresponding to each clothing cluster, a clothing model is learned. Each clothing model represents a set of clothes that the person wears in one or more of the images in the face cluster, which is composed of: (1) the clothing model's signatures that describe the overall color and texture patterns of the set of clothes (where a clothing model's color (texture) signature is generated by concatenating the individual color (texture) signatures obtained from each image in the cluster of the clothing set); and (2) timestamps of the images in which the set of clothes appears.

Each clothing model is used as a probing filter in order to retrieve a person who was not identified by the face detector stage in the photos captured on the same day or within another desired period. More specifically, a multi-scale sliding window is applied to the image in question and the signatures of the cropped region are compared with the clothing model's signatures. The color (texture) signature of the cropped region is matched with a clothing model's color (texture) signature based on the Earth Mover's distance metric. The color-based and texture-based distances can be summed up to give the final distance between the cropped region and the clothing model, which indicates a confidence value in the clothing model. For clothes matching, the color-based distance, DC, is obtained by matching the color signatures using the EMD, and the texture-based distance, DT, is obtained by matching the texture signatures. Finally the overall distance, D, between the pair of clothes is obtained according to:

$$D=(DC+DT)/2$$

As mentioned, in order to prune false detections on the background, the person's head-shoulder information can be employed to efficiently remove the regions that are not likely to be part of the person's body. Due to the "unique-object" constraint (i.e. no person can appear more than once in an image), only the most likely location and scale of the person is retrieved from an image if the maximum confidence by applying the clothing models of the person exceeds a predefined threshold; otherwise, the person is not found in the image.

Figure 6:
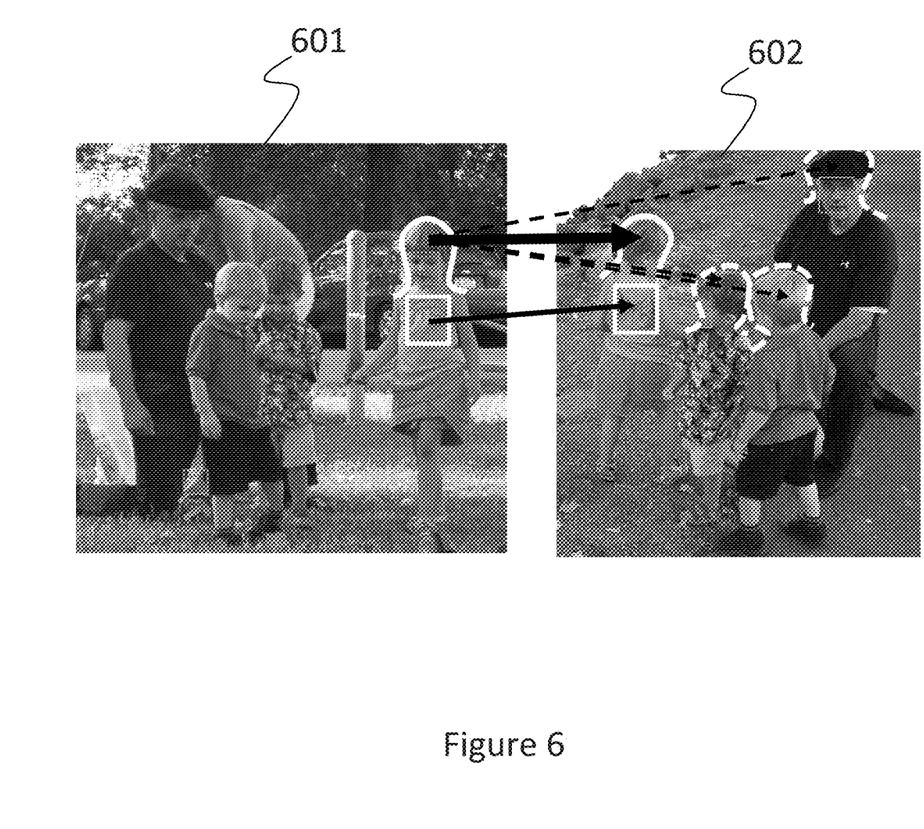
FIG. 6 is a schematic representation of a person detection operation performed on an image.

FIG. 6 is a schematic representation of a person detection operation as performed on an image. Image 601 represents an image in which a girl has been identified using the face detector. Accordingly, the girl has an associated clothing box outlined in white in 601. In image 602, in which the girl's face is not visible, and in which it would otherwise not be possible for a face detection system to identify the girl, the clothing signature as determined from the clothing region identified in 601 is used to identify the girl. Similar head-shoulder regions of some of other people in image 602 have been identified, but it is clear that the clothing signature of the girl does not correspond to the clothing of any of those other identified people in the image 602.

Accordingly, the provision of person detection in an image is not dependent on a face detector and thus, subjective to the performance of the face detector (which usually can only detect up to 70% of faces). According to embodiment described herein, through face clustering, major characters in an image collection are identified. Then, for each person of interest, his/her clothes features in a cluster are extracted and consolidated to generate a number of clothing models. The models are used to search other images (not included in the cluster) taken around the same time, so as to find images of this person which were missed in the face detection or face recognition stages.

What is claimed is:

1. A method for processing image data, comprising:
   generating face data representing a set of detected faces from data representing a set of images forming a library of images;
   using the face data to determine a sub-set of the images from the library in which at least the same person appears;
   generating at least one clothing signature for the person representing clothes worn by the person in at least one of the images in the sub-set by,
      using the face data, defining respective facial regions for identified faces and, on the basis of the facial regions, defining respective corresponding regions for hair and clothing;
      using image pixel data within the facial and hair regions, generating a measure of the skin and hair tones for the person; and
      using the measure to discard those regions of the image corresponding to skin and hair within the clothing region in order to provide a clothing mask representing a region of clothing for the person; and
   using the or each clothing signature, identifying, by a processor, further images of the person in the library of images without detecting faces of the person in the images.

2. A method as claimed in claim 1, wherein generating the face data further comprises generating the face data is using a high threshold face detector.

3. A method as claimed in claim 1 further comprising:
   for a given clothing signature of the person, determining a range for the time of capture of images in the sub-set, and using the range to select an image in the library which was captured in a predefined time period around the range.

4. A method as claimed in claim 1, further comprising:
   segmenting the facial, clothing, and hair regions into relatively smaller regions; and
   discarding any of the smaller regions representing background or overlapping areas.

5. A method as claimed in claim 1, wherein generating the measure of the skin and hair tones comprises clustering pixels in the skin and hair regions using a Gaussian Mixture Model.

6. A method as claimed in claim 1, wherein generating the at least one clothing signature further comprises clustering pixels in the at least one clothing signature using a Gaussian Mixture Model.

7. A method as claimed in claim 6, wherein the Gaussian Mixture Model uses a pixel value in the CIELAB colour space.

8. A method as claimed in claim 1, wherein identifying the further images of the person comprises:
   using the or each clothing signature as a probing filter in order to retrieve an image of the person not identified in a face detection stage.

9. A method as claimed in claimed 8, further comprising:
   using a multi-scale sliding window applied to an image to compare signatures of a cropped region with the or each clothing signature; and
   matching to the or each clothing signature using an Earth Mover's Distance (EMD) metric.

10. A method as claimed in claim 9, wherein a color-based distance, DC, is obtained by matching the color signatures using the EMD metric, and a texture-based distance, DT, is obtained by matching texture signatures; wherein an overall distance, D, between the pair of clothes is obtained according to D=(DC+DT)/2.

11. A method as claimed in claim 1, wherein, for a plurality of clothing signatures each representing a set of clothes worn by the person, the method further comprises concatenating those clothing signatures in order to provide a representative clothing signature for that set of clothes.

12. An apparatus for processing image data from an image library, comprising:
   a processor; and
   a memory on which stored machine readable instructions that are to cause the processor, to generate face data representing a plurality of detected faces in images from the library, to:
      generate a sub-set of images from the library using the face data in which at least the same identified face of a person appears in respective ones of the images;
      for the sub-set, process the face data corresponding to the identified face in order to generate signature data representing at least one clothing signature for the person, the clothing signature representing clothes worn by the person in at least one of the images in the sub-set;
      identify further images of the person in the library not present in the sub-set using the signature data; and
      define respective facial regions for identified faces using the face data, and, on the basis of the facial regions, generate hair and clothing data representing respective corresponding regions for hair and clothing;
      generate a measure of the skin and hair tones for the person using image pixel data within the facial and hair regions;
      discard those regions of the image corresponding to skin and hair within the clothing region using the measure in order to generate clothing mask data representing a region of clothing for the person; and
   wherein the machine readable instructions are further to cause the processor to use the or each clothing signature to identify further images of the person in the library of images without detecting faces of the person in the images.

13. The apparatus as claimed in claim 12, wherein the machine readable instructions are further to cause the processor to:
   generate time data representing a range for the time of capture of images in the sub-set, and use the time data to select an image in the library which was captured in a predefined time period around the range.

14. The apparatus as claimed in claim 12, wherein the machine readable instructions are further to cause the processor to:
   segment the facial, clothing, and hair regions into relatively smaller regions; and
   discard any of the smaller regions representing background or overlapping areas.

15. An image processing method comprising:
   in a library of images represented as image data, processing the image data in order to detect the faces of people in the images;

for each identified face corresponding to a person, clustering the corresponding images into a sub-set for that person;

for respective sub-sets, generating signature data representing a plurality of clothing signatures for the person by, using the face data, defining respective facial regions for identified faces and, on the basis of the facial regions, defining respective corresponding regions for hair and clothing;

using image pixel data within the facial and hair regions, generating a measure of the skin and hair tones for the person; and using the measure to discard those regions of the image corresponding to skin and hair within the clothing region in order to provide a clothing mask representing a region of clothing for the person; and using the signature data, identifying, by a processor, a further sub-set of images in the library of images comprising the person without detecting faces of the person in the further sub-set of images.

16. A method as claimed in claim 15, wherein the clothing signatures for a set of clothes of the person obtained from different images are concatenated into one representative signature for the set of clothes.

\* \* \* \* \*

UNITED STATES PATENT AND TRADEMARK OFFICE
CERTIFICATE OF CORRECTION

| | |
|---|---|
| PATENT NO. | : 8,724,902 B2 |
| APPLICATION NO. | : 12/791680 |
| DATED | : May 13, 2014 |
| INVENTOR(S) | : Wei Zhang et al. |

It is certified that error appears in the above-identified patent and that said Letters Patent is hereby corrected as shown below:

In the Claims

In column 11, line 36, in Claim 2, delete "data is" and insert -- data --, therefor.

Signed and Sealed this
Twenty-ninth Day of September, 2015

Michelle K. Lee
*Director of the United States Patent and Trademark Office*